United States Patent Office 3,106,808
Patented Oct. 15, 1963

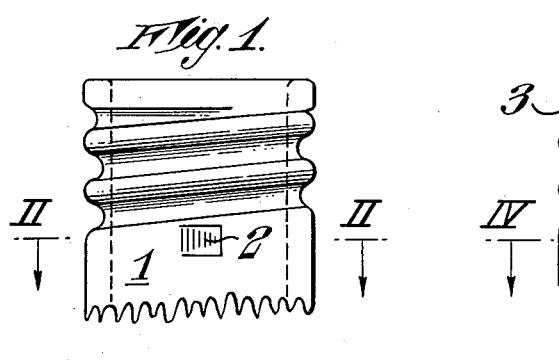
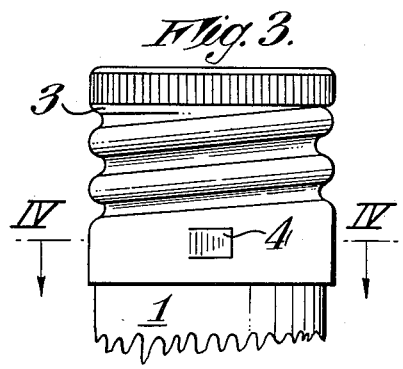
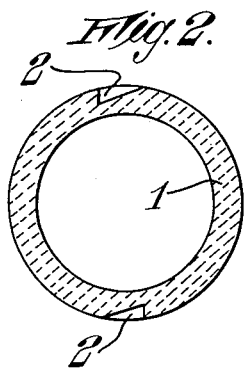
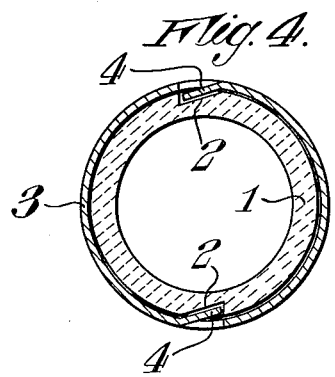
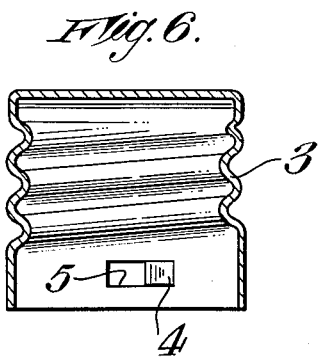
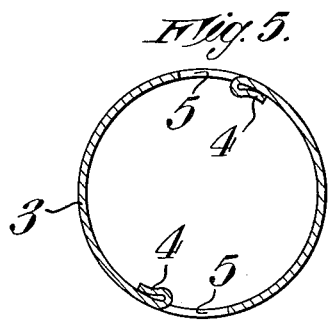

3,106,808
METHOD OF AND MEANS FOR SECURING CAPS OR STOPPERS TO BOTTLES AND OTHER SUITABLE CONTAINERS
Charles Howard Lawdham, London, England, assignor to Robinson Bros. Cork Growers Limited, Halifax, London, England, a corporation of Great Britain
Filed Aug. 11, 1958, Ser. No. 754,266
1 Claim. (Cl. 53—42)

The invention relates to a method of and means for securing caps or stoppers to bottles and other suitable containers.

An ideal method of securing caps or stoppers is one which enables caps to be initially sealed or locked to bottles or containers—to prevent illicit tampering with the contents of the latter—but permits the caps to be used again following displacement or rupture of the seal, and also avoids retention upon containers of any part of caps or stoppers which may be difficult to remove should containers be required for further use.

The object of the present invention is to provide a method of and means for securing caps or stoppers to bottles and other suitable containers which fulfill the conditions set forth in the preceding paragraph.

According to the invention the method of and means for securing a cap or stopper to a bottle or other suitable container consists in providing the bottle or the like with an indentation or indentations therein or a protuberance or protuberances thereon and subsequently causing the skirt of the cap to co-act with or conform to the said indentation or indentations or protuberance or protuberances and seal the cap in position, the conformity of the cap being destroyed when the cap is first removed but permitting the cap to be replaced.

In order that the invention may be fully and clearly comprehended the same will now be described with reference to the accompanying drawings, in which:

FIGURE 1 is an elevation of the upper end or mouth of a bottle constructed for use according to the invention.

FIGURE 2 is a sectional plan on the line II—II of FIGURE 1.

FIGURE 3 is an elevation of the upper end of a bottle having a cap or stopper secured thereto according to the invention.

FIGURE 4 is a sectional plan on the line III—III of FIGURE 3.

FIGURE 5 is a similar view to FIGURE 4—with the neck of the bottle omitted for the sake of clarity—illustrating the appearance (somewhat exaggerated) after the initial removal of the stopper from the bottle to which it has been secured according to the invention.

FIGURE 6 is a sectional elevation of the cap shown in FIGURE 5.

FIGURE 7 is a greatly enlarged sectional plan of a fragment of a cap constructed according to the invention, illustrating the distorted seal caused by destruction of the co-acting portion or conformity when the cap is first removed from a bottle.

Similar reference numerals refer to similar parts throughout the several views.

Figure 8:
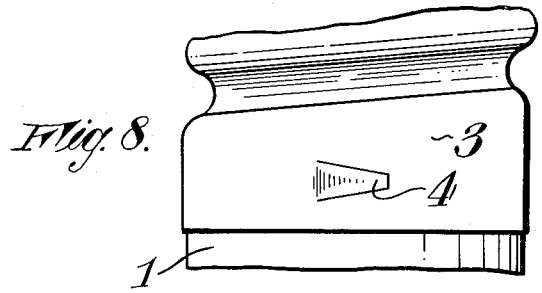
FIGURES 8, 9 and 10 are similar views to FIGURE 3 showing modified types of lugs formed upon caps or stoppers for sealing the same.

Referring to FIGURES 1–7: the outer surface of a bottle 1 has a pair of diametrically-opposite indentations 2 formed therein below the customary screw-threaded portion, the indentations tapering inwardly.

Intended to be associated with the aforesaid bottle is an orthodox dished cap or stopper 3 preferably composed of ductile metal.

To secure and seal the cap 3 to the bottle 1, the cap is placed over the mouth of the bottle to enclose the mouth and to envelop the screw-threaded portion and the indentations 2. The assembly of bottle and cap is then subjected to treatment in appropriately designed apparatus which causes the skirt of the cap or stopper to co-act with or conform in shape to the screw-threaded portion and to the indentations 2 (see FIGURES 3 and 4).

It will be observed on reference to the last-mentioned figures that when the cap is made to conform with the indentations 2 inwardly bent lugs 4 are formed by severing the skirt of the cap round three sides of the indentations so that the lugs mesh with the indentations.

To remove the cap from the bottle the cap is unscrewed in the usual manner whereupon the shoulders of the indentations bend or distort the lugs 4 (as shown in FIGURE 5), continued unscrewing of the cap folding the lugs so that they lie against the inside of the cap (as clearly shown in FIGURES 6 and 7).

In this manner and by these means visible evidence is provided of the seal having been broken by the fact that apertures 5 in the cap skirt now appear instead of the hitherto visible lugs. Any attempt to manipulate the folded or distorted lugs with the object of causing them to subsequently re-engage with the indentations on replacement of the cap results in breakage of the lugs or a very ragged appearance being imparted thereto which immediately reveals the fact to any interested person.

Following initial displacement of the cap or stopper relative to the bottle the said cap may be replaced upon and removed from a bottle as often as desired, no damage having been caused to the normal screw-threaded part.

Instead of two indentations as heretofore, only one, or more than two, may be provided in a container, and it must also be understood that instead of an indentation or indentations being arranged below the screw-threaded portion the indentation(s) may be arranged in the said portion.

Referring to FIGURE 8: the lug 4 is tapered and may be adapted to co-act with a similarly shaped indentation in a bottle or container, or it may function just as successfully in combination with an indentation of the shape shown in FIGURES 1–4.

Figure 9:
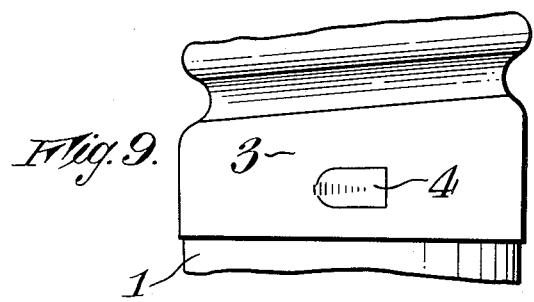
Figure 10:
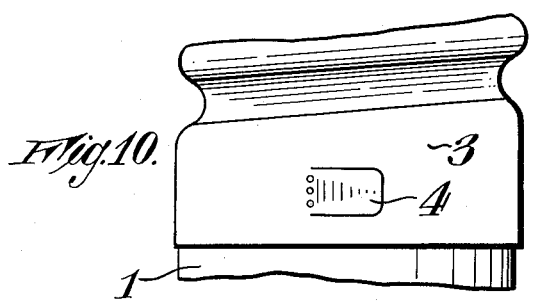
Figure 11:
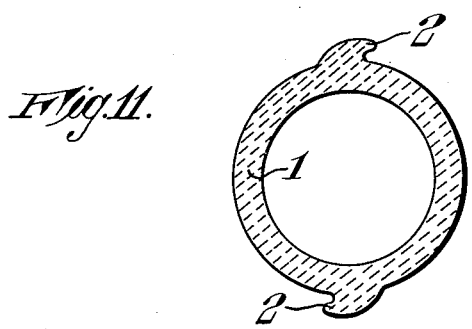
FIGURE 11 is a sectional plan of a bottle neck constructed according to a modification of the invention.

In the cap or stopper shown in FIGURE 9, it will be observed that the lug 4 is weakened by the indentation or lug being almost severed at the inner end thereof, and that in the example illustrated at FIGURE 10 the inner end of the lug is perforated to weaken the same. In both these instances the lug is thereby enabled to break off at the weakened parts when the caps are initially displaced. Otherwise the method of their attachment and operation is identical with the stoppers already described with respect to FIGURES 1–7 of the drawings.

In all the foregoing examples of the invention the cap or stopper may be initially treated to conform with the screw-threaded portion of the container and be subsequently treated to conform to or to co-act with an indentation or indentations or a protuberance or protuberances as aforesaid.

If desired, a cap or stopper may be employed whose skirt has been screw-threaded prior to attachment to a bottle or the like.

Furthermore, it must be understood that the invention may be carried into effect with bottles or containers having intermittent or multi-threaded necks with bottles or the like with which are employed press-on or push-on caps or stoppers.

The interior of the caps may be furnished with the usual cork, metal-foil or other suitable inserts or means substantially as shown in FIGURE 6.

I claim:

A method of securing and sealing a deformable cap to a bottle which permits reuse of said cap after breaking the seal, said bottle being provided with an externally threaded neck portion at the mouth of said bottle and diametrically opposed indentations on said neck below said threaded portion, comprising placing said cap over said mouth to envelop said mouth and said threaded portion, pressing the skirt portion of said cap to deform the material inwardly of said skirt portion opposite said indentation, severing the skirt portion of said cap around all but one side of the indentation to form lugs in the deformed skirt portion opposite said indentation thereby making said lugs integral with said skirt portion, whereby upon bending said lugs interiorly of said cap through rotation of said cap to unscrew it, visible indication of tampering is provided by apertures appearing in the cap skirt at said lug portion.

References Cited in the file of this patent

UNITED STATES PATENTS

| | | |
|---|---|---|
| 2,414,420 | Sebell | Jan. 14, 1947 |
| 2,470,057 | Spender | May 10, 1949 |
| 2,752,060 | Martin | June 26, 1956 |
| 2,827,193 | Martin | Mar. 18, 1958 |